United States Patent
Accorroni Rivas (10) Patent No.: US 11,284,565 B2
(45) Date of Patent: Mar. 29, 2022

(54) SUGAR CANE BIOMASS CHOPPER

(71) Applicants: Compañía Inversora Industrial S.A., La Encantada (AR); Bruno Accorroni Rivas, Concepción (AR)

(72) Inventor: Bruno Accorroni Rivas, Concepción (AR)

(73) Assignee: Compañía Inversora Industrial S.A., La Encantada (AR)

( * ) Notice: Subject to any disclaimer, the term of this patent is extended or adjusted under 35 U.S.C. 154(b) by 141 days.

(21) Appl. No.: 16/589,508

(22) Filed: Oct. 1, 2019

(65) Prior Publication Data

US 2020/0100429 A1 Apr. 2, 2020

(30) Foreign Application Priority Data

Oct. 2, 2018 (AR) .............................. 20180102837

(51) Int. Cl.
*A01D 45/10* (2006.01)
*A01D 47/00* (2006.01)
*A01D 41/12* (2006.01)
*A01D 45/00* (2018.01)

(52) U.S. Cl.
CPC .......... *A01D 45/10* (2013.01); *A01D 41/1217* (2013.01); *A01D 45/003* (2013.01); *A01D 47/00* (2013.01)

(58) Field of Classification Search
CPC .... A01D 47/00; A01D 45/10; A01D 41/1217; A01D 45/003; A01D 29/01
See application file for complete search history.

(56) References Cited

U.S. PATENT DOCUMENTS

| | | | | |
|---|---|---|---|---|
| 3,596,447 A * | 8/1971 | Makeham | ............... | A01D 45/10 56/63 |
| 3,772,864 A * | 11/1973 | Rodrigue | ............... | A01D 45/10 56/63 |
| 3,791,114 A * | 2/1974 | Fowler | ................... | A01D 45/10 56/13.9 |
| 4,033,518 A * | 7/1977 | Fleming | ................. | A01F 29/00 241/47 |
| 4,250,697 A * | 2/1981 | Bray | ...................... | A01D 47/00 171/58 |
| 4,270,337 A * | 6/1981 | Pinto | ...................... | A01D 45/10 56/13.9 |
| 4,272,947 A * | 6/1981 | Mizzi | ..................... | A01D 45/10 56/121.4 |

(Continued)

*Primary Examiner* — Arpad Fabian-Kovacs
(74) *Attorney, Agent, or Firm* — The Morales Law Firm; Joseph L. Morales (57) ABSTRACT

A sugarcane biomass chopper that can be attached to a harvester. The sugarcane chopper has a main support configured for attachment to arms of a harvester's top cutter or topper. The sugarcane chopper further includes a leaf deflector attached to said main support. The shredder is connected to said leaf deflector on one side and a pneumatic impulse resource on a second side. The pneumatic impulse resource is further connected to a flow concentrator; and a discharge pipe connected to said flow concentrator. The chopper is configured so that biomass is directed by the leaf deflector to the pneumatic impulse resource and into the shredder, which in turn discharges the shredded biomass through the flow concentrator and the discharge.

2 Claims, 6 Drawing Sheets

(56) References Cited

U.S. PATENT DOCUMENTS

| | | | | |
|---|---|---|---|---|
| 4,295,325 A * | 10/1981 | Cannavan | A01D 45/10 56/13.9 |
| 4,312,143 A * | 1/1982 | Kado | E01H 5/045 37/261 |
| 5,379,578 A * | 1/1995 | Landry | A01D 45/10 56/14.5 |
| D493,268 S * | 7/2004 | Wysong | D34/28 |
| 6,910,321 B2 * | 6/2005 | Hinds | A01D 45/10 56/63 |
| 6,921,037 B2 * | 7/2005 | Wysong | B65G 69/0491 239/665 |
| 6,939,222 B2 * | 9/2005 | Grossjohann | A01D 43/087 460/114 |
| 7,681,388 B1 * | 3/2010 | Hinds | A01D 47/00 56/126 |
| 7,694,501 B1 * | 4/2010 | Hinds | A01D 45/003 56/63 |
| 7,805,916 B2 * | 10/2010 | Hinds | A01D 45/003 56/62 |
| 8,220,236 B1 * | 7/2012 | Benner | A01D 47/00 56/63 |
| 2009/0113866 A1 * | 5/2009 | Hattert | A01D 43/087 56/13.3 |
| 2010/0186363 A1 * | 7/2010 | Hinds | A01D 47/00 56/126 |
| 2012/0110969 A1 * | 5/2012 | Hinds | A01D 45/10 56/63 |
| 2013/0116894 A1 * | 5/2013 | Perez-Iturbe | A01D 41/141 701/50 |
| 2013/0190061 A1 * | 7/2013 | Kirchbeck | A01D 43/14 460/1 |
| 2014/0165522 A1 * | 6/2014 | Braunbeck | A01D 45/10 56/10.6 |
| 2015/0069158 A1 * | 3/2015 | Graham | A01F 29/005 241/101.5 |
| 2017/0112058 A1 * | 4/2017 | Craig | A01D 41/1208 |

* cited by examiner

SUGAR CANE BIOMASS CHOPPER

CROSS-REFERENCE TO RELATED APPLICATIONS

This application claims priority from Argentinean application serial number 20180102837, filed on Oct. 2, 2018, which is incorporated herein by reference in its entirety.

FIELD OF THE INVENTION

This application is directed to harvesting devices, more specifically to a sugar can picking device incorporated on a combine harvester.

PRIOR ART

Biomass is organic matter coming from plants. Photosynthesis is the process by which solar energy is stored in plants. Animals capture that energy as they eat the plants. Waste such as harvest remainders, pruned leftovers, manure and miscellaneous organic trash are excellent sources of biomass to be used as fuel.

Biomass has a wide spectrum of uses such as direct use by burning to obtain heat or to generate electricity by means of steam turbines. Biomass can also be used to obtain methane gas, biodiesel and other biofuels.

Sugarcane is one of the crops with the highest capacity to convert solar energy into biomass. If only bagasse and straw are taken into account, cane fields store almost the equivalent to a ton of oil for each ton of sugar that can be produced. Biomass combustion does not increase atmospheric carbon concentration, because it only releases to the atmosphere the carbon fixated by the plants as they grew.

In recent years, biofuels have gained ground in the world's energy matrix.

What are Biofuels?

Solid, liquid or gas fuels produced from biomass are called biofuels. Biofuels are renewable, good substitutes for fossil fuels. Most biofuels available in the market nowadays are produced from plants. When burned, biofuels release $CO_2$ without net carbon emissions. Certain plants are being grown specifically for biofuel production.

In the United States, switchgrass (*Panicum virgatum*), soybeans and corn are important biofuel sources. Brazil uses sugarcane, while Europe processes beets and wheat.

Biofuels are classified into three groups: first generation, second generation, and third generation.

First-generation biofuels are produced by means of conventional technology using sugar, starch, vegetable oil or animal fat as sources.

As their raw materials are also food sources, the "food vs, fuel" debate is a major issue regarding first-generation biofuels.

The production of first-generation biofuels has limitations, as it could threaten food supply and biodiversity.

In order to cater for the growing demand for biofuels, second-generation biofuels have been developed. These second-generation biofuels are produced from cultivations not destined for food, or from non-edible parts of food crops considered as waste, among them stalks, pods, wood chips, and fruit peels.

Third-generation biofuels are those produced from algae. The production of algal oil or fuel entails fermenting algal carbohydrates.

Biofuels and CO2 without Net Carbon Emissions

Biofuels are good alternatives to fossil fuels because they produce carbon dioxide without net carbon emissions when they are burned, $CO_2$ without net carbon emissions does not have a carbon footprint, because it does not have a net effect on carbon concentration in the biosphere.

When burned, biomass releases carbon dioxide, which is immediately absorbed by the plants—source of biomass. Through this cycle, plants remove carbon from the atmosphere, and carbon is once again released into the atmosphere when plants are burned. Thanks to this balance, biomass does not generate net carbon emissions.

In the United States, there are many incentives and laws on biofuel use at the state and federal levels. In Washington state alone, there are 4 incentive programs and 13 laws. Other countries, especially in Europe, also offer similar incentives to stimulate the use of products of biological origin such as biofuels.

Our country is showing a trend towards growth in this sector and, in this regard, this invention may be considered a practical, economical way to best use sugarcane biomass.

SUMMARY OF INVENTION

The main object of this invention is a SUGAR CANE PICKING DEVICE INCORPORATED IN A COMBINE HARVESTER. It is conceived to process biomass in sugarcane cultivation, especially developed to obtain the biomass taking the upper section of the cane, nowadays left as straw on the field during harvest.

The machine in this invention stands out in that it uses the progression of the harvester to, at the same time, chop and collect the biomass coming from the tops of sugarcanes, so that two operations are simultaneously carried out in one single pass.

With the chopper in this invention, it is possible to obtain biomass for different purposes, such as:

1. Feeding livestock, ideal to prepare silage or daily intake. The fact that the whole harvest is green harvest favors preparing the biomass for daily intake or silage destined to feed different livestock animals.
2. Biofuel for cogeneration, in parallel with sugarcane harvest. This biomass tends to dry due to the change in seasonal and climate conditions with the arrival of cold weather and frosts, favoring a drier preparation and turning it into a renewable fuel with excellent physicochemical characteristics.

With the biomass chopper machine in its novel, special invented layout, it is possible, simultaneously with the work of the sugarcane harvester, for biomass to be obtained from cane tops, which results in the following:

Saving supplies (fuel).
Improving the operative logistics of sugarcane production, making it less necessary to enter the plot.
Obtaining a technology that facilitates preparing and collecting biomass from sugarcane tops.
Performing two tasks in only one operation (harvesting the canes, chopping and collecting the biomass from the cane tops).
Reducing costs and operative times
Achieving a better energy balance and optimizing fuel consumption, as two tasks are performed in one pass.
Lowering environmental impact by eliminating compaction and the impairment of the crop as compared with the conventional biomass collection system.
Improving the straw blanket, making it more uniform and less dense, thus facilitating the subsequent tasks on the field, such as decompaction, fertilization and grubbing, and avoiding straw burning.

It is an invention that defines a new combination of media conceived to achieve a superior result, which can be unpredictable and surprising even for an expert in the specialty. Consequently, in addition to being new, its constructive and functional conception clearly shows to be inventive, so that it meets the conditions required by law to be considered a utility patent.

BRIEF DESCRIPTION OF FIGURES

In order to materialize the advantages briefly commented above, to which users and experts in this specialty may add many more, and to facilitate the understanding of the constructive, constitutive and functional characteristics of the invented chopper machine, described below is a preferred example that is illustrated, schematically and without a given scale, in the attached figures. It is worth expressly clarifying that, precisely because it is an example, it should not be assigned a limitative or exclusive nature of the scope of protection of the present invention patent. It is simply provided for merely explanatory and illustrative purposes, regarding the basic conception on which the invention is based.

It is worth pointing out that all figures, with the same reference letters and numbers, correspond to the same or equivalent constitutive parts or elements of the whole, according to the example chosen for the present explanation of the invented chopper.

DESCRIPTION OF THE INVENTION

Direct Advantages of the Application of this Invention

As time went by, machinery became modernized. Maybe the greatest technological impact was made by the combine harvester, which made it possible to carry out a green harvest, leaving cane residues on the plot. Also, there was no need to burn them, as had been taking place with the Louisiana harvesting method, used in the 1980s.

This modification in the environment entailed the need to modify the way to manage other practices, such as fertilization, weed control, etc.

Looking to the future, this activity faces major challenges such as ensuring its economic, social, and environmental sustainability, as well as streamlining full bioenergetic use, with practices seeking to improve the energy balance of production systems.

In this context, using the biomass chopper introduced in this invention attached on a sugarcane harvester provides a better energy balance in fuel consumption, as it carries out two tasks in one pass. Thus, it reduces exhaust gas emission, lowers operating costs, leaves a homogeneous straw blanket in lower quantity, and favors subsequent agricultural practices such as decompaction, fertilization and grubbing.

It is worth pointing out that after the biomass chopper of this invention is used, two basic possibilities of use arise, i.e.:

1. Feeding livestock, ideal to prepare silage or daily intake.

2. Biomass fuel for the cogeneration (bagasse-fired boilers) or generation of electric energy (special biomass-fired boilers).

Livestock Feeding

Climate variability is a major problem for agriculturers today.

Actually, the natural variability of rainfall, temperature and other climate conditions is the main factor that accounts for changes in agricultural production, which in turn is one of the main factors in the lack of food security.

With the biomass chopper that is the object of this invention, it is possible to use the better share of sugarcane waste, green leaves and tops, turning them into an excellent high-energy food and with exceptional production. This allows our producers to face shortage situations—in the face of the worst droughts, we will always have a non-productive green blanket for the sugar-alcohol industry in our plantations, which so far has mostly been discarded, thrown on the field as straw.

Biomass Fuel

In our country and around the world, there still persists a tradition of burning cane fields, which generates multiple problems of an agronomic, environmental, and socio-economic nature.

The incorporation of technologies for agricultural crop residue management regarding the cogeneration (bagasse-fired boilers) or generation of electric energy (special biomass-fired boilers) is crucial to eliminate this problem that increasingly compromises the sugar industry.

Therefore, knowing the amount of residue available after sugarcane green harvesting and considering the most appropriate machinery for collection and baling are key aspects in the evaluation of strategies regarding the utilization and viability of using agricultural crop residue commercially.

Currently, there is a process of tying and baling, whether in rolls or in mega bales, which accumulate an excessive amount of inorganic matter. This results in a loss of heating value that is carried to ashes, which results in a very large amount of ash and a significant erosion in the combustion chamber due to the high amount of earth.

The biomass chopper object of this invention stands out because it allows to obtain clean fuel, without inorganic matter, as the collection is made from the cane tops.

The received material is finely chopped homogeneously, and blown up to its own collection cart increasing its contact surface with air, which favors its drying inside the combustion chamber of the conventional bagasse-fired boilers, and thus significantly increasing its heating value and leaving minimum ashes.

In terms of energy, according to the electricity generation potential in sugarcane mills, each ton of agricultural crop residue is estimated to produce 0.4 megawatts; this means that four tons of agricultural crop residue would amount to approximately one oil ton.

Also, the field is left covered with a thinner, more homogeneous straw layer, made up by the remainder of the leaves, providing coverage and incorporating organic matter to the field. This facilitates subsequent agricultural practices such as decompaction and fertilization in dry canes, and grubbing and clearing in the cane fields that have already completed their cycle, without any need for undesirable burning.

Without considering the inconveniences that would be caused by fully removing straw, we could said that with the current method of tying and baling of the post-harvest straw blanket, whether in rolls or in mega bales, an excessive amount of inorganic matter is accumulated. This results in a loss of heating value that is carried to ashes, which results in a very large amount of ash and a significant erosion in the combustion chamber due to the high amount of earth.

The operational principle of the biomass chopper of this invention is based on collecting and processing sugarcane upper leaves and tops (60% of the agricultural crop residue) simultaneously with the operation of the combine harvester.

In fact, the biomass chopper object of this invention is essentially different in that it processes the upper aerial part of sugar canes, resulting in a novel operation which allows to obtain the most virtues and energy potential from the crop.

With this invented machine, the progression of the harvester is used to carry out the chopping and collecting of the upper leaves and tops at the same time, performing two operations in one pass.

To this end, the special, novel adaptation of the chopper's mechanical resources was designed so that they are activated by using the same hydraulic system as the harvester. The work of both machines thus becomes automated and coordinated, without detriment to the harvesting operation.

With the present invention, and a previous calculation of the necessary power for the work to be done, a conventional fodder chopper was used, of the type designed to operate attached on a tractor and mechanically activated by power take-off and provided with a three-point support.

With the novel, specific design of this chopper machine, the support for assembly on the tractor was eliminated and a new support was designed to be placed at the end of the arms of the top cutter or topper of the cane harvester, so that it projects from that end.

Also, activation was changed from a mechanical to a hydraulic drive-shaft transmission system, to which end a coupling support and a mounting sleeve are included. The latter relates to an activating hydraulic motor, which operates connected to the harvester's hydraulic installation, to which it is linked through the pertinent flexible hoses. In this way, the chopper can be directly activated from the harvester's cabin.

If preferred, it will be possible to use a series M-300 hydraulic motor, which comprises a 300-cc gear motor, fitted with a relief circuit for its protection, directly activated from the machine cabin. It will be the actuator responsible for transforming the oil's hydraulic motion into mechanical motion.

The correct placement of the chopper at the height of cane tops, together with a good selection and distribution of the chopping blades, guarantees excellent processing and collection.

Equipment in Operation—Field Tests

Before the harvest was started, the invented chopper was calibrated and tuned-up, duly mounted on the harvester, and the chopping size, height and orientation of the propeller tube for correct discharge were selected.

In one same pass, sugarcane was collected and simultaneously biomass was finely chopped and discharged towards a first transfer. On a second transfer, programmed after the first, the cane destined to industry was unloaded.

During the field tests, the load ratio between the two collected products was measured. The result was one load of biomass every four loads of cane for industry, depending on the yield and status of the cane field, as well as the time of the year and the preceding climate conditions.

Also, measurements were made of percentage removal of the straw uniformly distributed by the primary and secondary roof turbine vents in charge of separating the impurities from the harvested cane. This determines a lower density of the agricultural crop residue blanket due to the collection of the upper leaves and tops by the chopper object of this invention.

Actually, the chopper object of this invention was verified to obtain a collection of approximately between 50% and 60% of the full agricultural crop residue.

Without a doubt, this reduction in agricultural crop residue improves soil permeability and allows subsequent tasks to be more effective, such as decompaction, fertilization or grubbing, avoiding the so undesirable straw burning that impairs both the crop and the soil.

In summary, the biomass chopper machine object of this invention can be claimed to yield the following benefits:

1. Processing and collecting clean biomass.
2. Making it possible to feed and produce livestock.
3. Providing us with a renewable fuel with excellent characteristics.
4. Having lower collection costs and fuel savings.
5. Reducing workload by conducting two operations simultaneously.
6. Having excellent performance.
7. Generating a lower amount of exhaust gases, thus reducing environmental impact.
8. Reducing compaction and crop impairment.
9. Facilitating field tasks after the harvest: decompaction, fertilization and grubbing.

Inventive Step

No currently-known biomass chopper proposes, or even suggests, the constructive solution derived from the statements in the preceding paragraphs.

Therefore, this is a proposal that, in addition to its novelty, presents a clear inventive step.

Detailed Description of a Preferred Example

Figures 1, 2, 3:
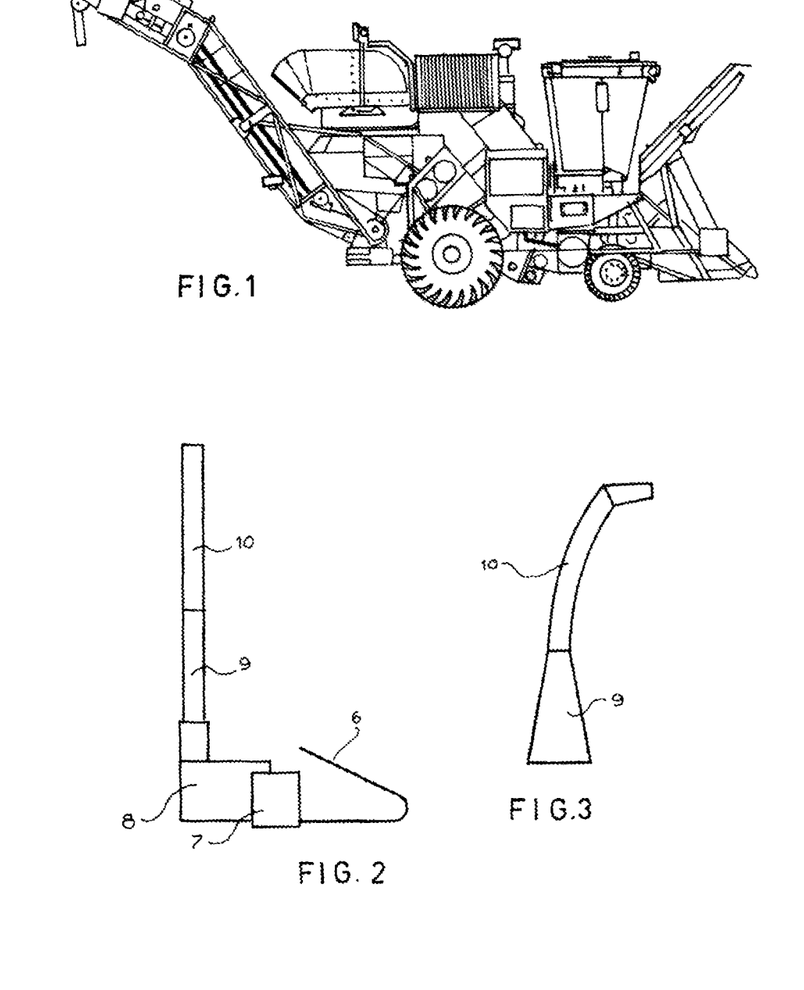
FIG. 1 is a side-view scheme representing a conventional sugar harvester.
FIG. 2 is a side-view scheme showing the general configuration of the chopper object of this invention.
FIG. 3 is a front-view scheme showing the general configuration of the chopper object of this invention.

As explained above, the sugarcane biomass chopper object of this invention has been conceived to be placed mounted on and connected to a combine harvester as the one represented in FIG. 1. In this way, it makes use of the harvester progression to, at the same time, collect and process the sugarcane upper leaves and tops, with the material obtained (biomass) being unloaded as it progresses, independently.

Figure 7:
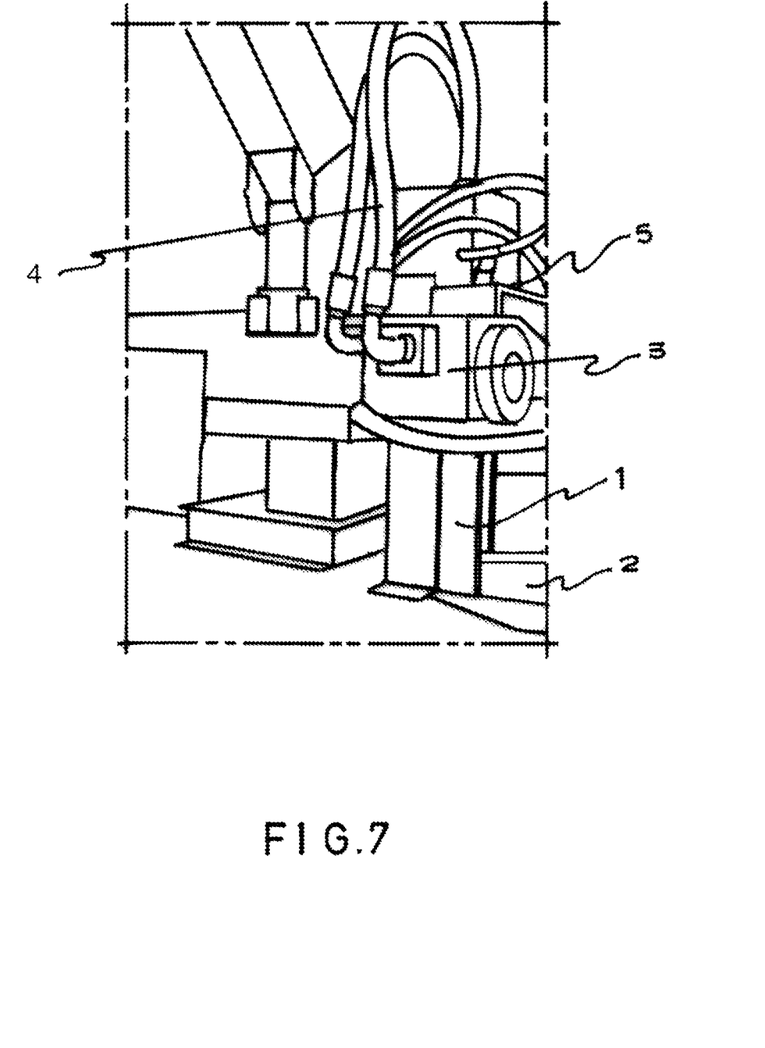
FIG. 7 is an enlarged detail in perspective, showing the lower part of the invented chopper.

As can be seen especially in the detail of FIG. 7, the invented chopper includes a main support (1) planned to be incorporated and attached to the arms of the harvester's top cutter or topper (2).

Also, by incorporating a support plate (3), a hydraulic motor (5) is added, which is fed by the hydraulic installation of the same harvester, through flexible hoses (4).

If we take a look at FIGS. 2, 3, 4 and 5, we can see that the chopper object of this invention comprises a front structure to deflect leaves (6), with the function of orienting the upper leaves and tops that are harvested towards the shredder device (7), activated hydraulically.

Figure 4:
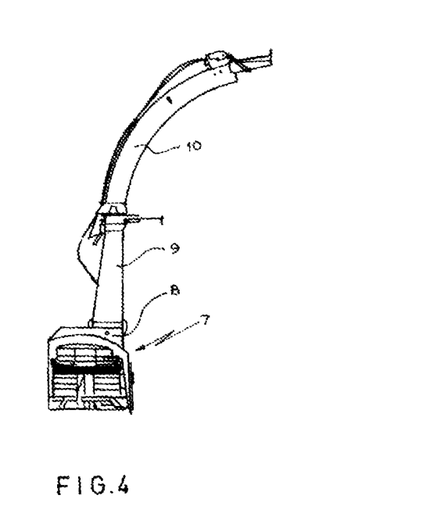
FIG. 4 is a front view of the biomass chopper object of this invention.
Figure 5:
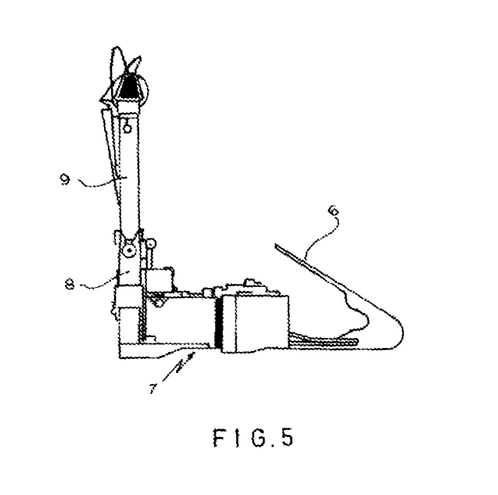
FIG. 5 is a side view of the same machine from the previous figure.

The same FIGS. 2 to 4 show the pneumatic impulse resource (8) through which the chopped material is led to the flow concentrator (9) associated to the discharge pipe (10).

Figure 6:
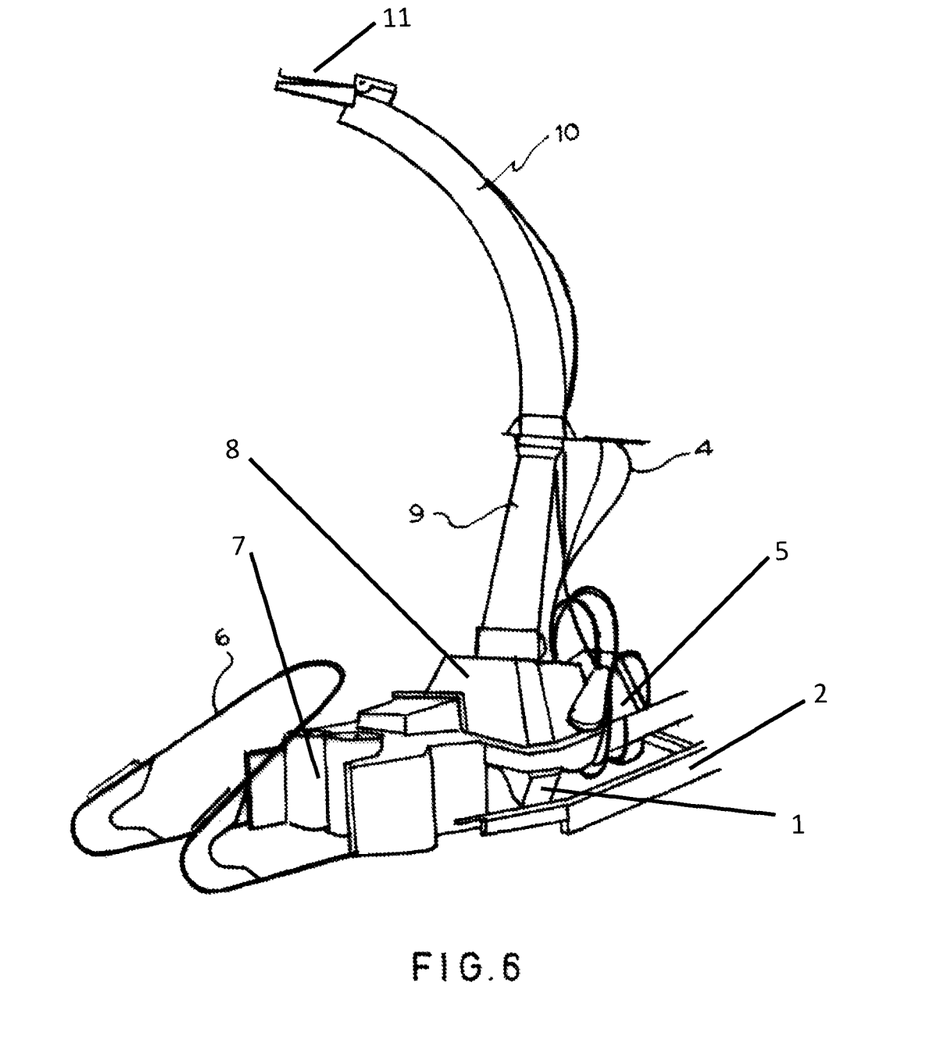
FIG. 6 is a perspective view showing the outside of the same chopper object of this invention.
Figure 9:
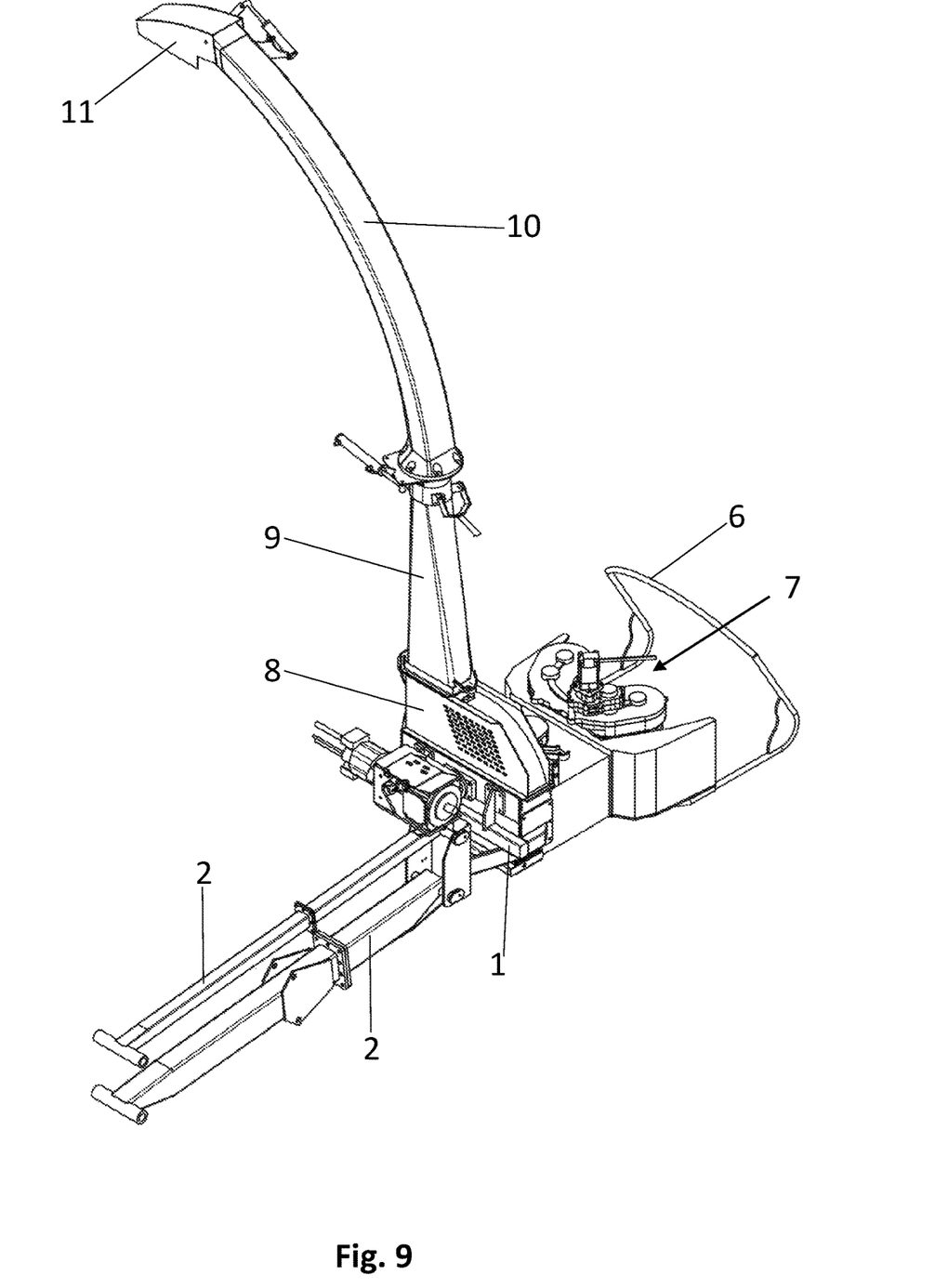
FIG. 9 is a perspective view of the main support in accordance with one embodiment of the present invention.

Especially FIG. 6 shows the invented chopper seen in perspective and mounted at the end of the arms of the harvester's top cutter. The main support (1) attaches to one or more arms (2) of the harvester's top cutter or topper so that the main support (1) (as shown in FIG. 9) can be raised until aligned to take the upper part of the plantation, and catch the leaves and tops as the harvester progresses.

Figure 8:
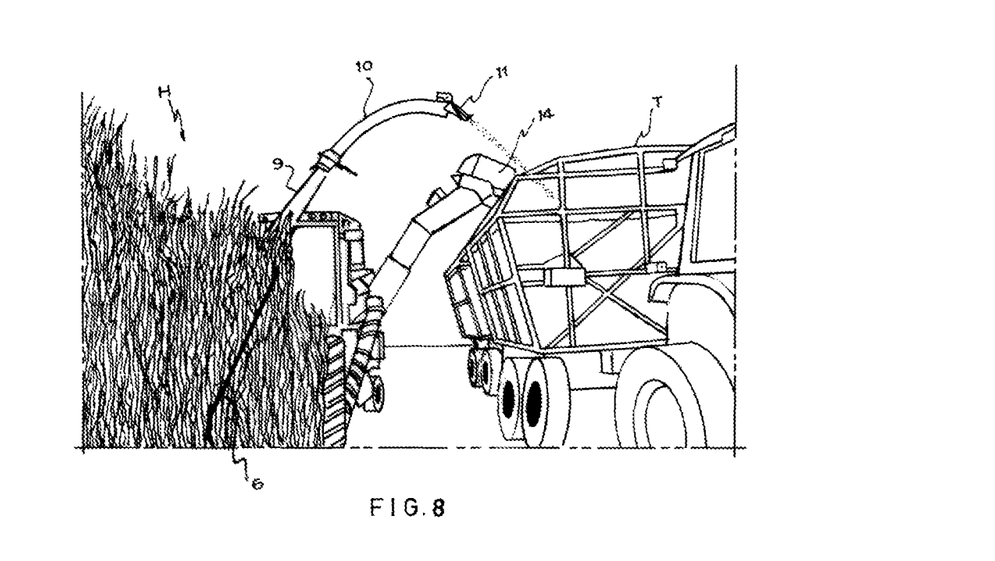
FIG. 8 is a global view, showing a harvester working together with the invented biomass chopper.

Finally, FIG. 8 shows how the invented biomass chopper operates, working on the upper leaves (H) of the plantation (P) and with its discharge nozzle (11) oriented towards the hopper (T) of the transport cart (12), which is laid out in tandem with the transport cart (13) where the harvested sugarcane is discharged, through the nozzle (14).

The nature and main object of the present invention having been described and exemplified, as well as the way in which it can be taken to practice, the following claims are made as regards ownership and exclusive rights:

1. A sugarcane biomass chopper attached on a harvester, characterized by being a piece of equipment that cuts, collects, chops, and launches the biomass from the sugarcane upper ends (leaves and tops) for the purposes of biofuel production, livestock feeding and other applications. It has been conceived to use the harvester's progression and, at the same time as the cane is harvested, chop and collect the biomass coming from the sugarcane tops, taking the upper leaves and the tops from the plantation. In this way, two operations are simultaneously conducted in one pass, and such chopped material is used to obtain biomass for different purposes such as livestock feeding, as well as the production of biofuel with excellent physico-chemical characteristics, while reducing the percentage of agricultural crop residue. It is placed at the end of the arms of the cane harvester topper, attached to a robust support from where it projects. It is activated by a hydraulic motor that, through flexible hoses, is connected to the harvester's hydraulic installation and managed from the harvester's cabin.

2. The sugarcane biomass chopper attached on a harvester, as claimed in item 1, characterized because it is hydraulically activated as if it were the original sugarcane harvester topper.

What is claimed is:

1. A sugarcane biomass chopper, comprising:
   a main support that attaches to one or more arms of a harvester's top cutter or topper, wherein the main support is configured to be raised and aligned with an upper section of a crop to be cut;
   a leaf deflector attached to said main support,
   a shredder connected to said leaf deflector on one side and a pneumatic impulse resource on a second side;
   the pneumatic impulse resource is further connected to a flow concentrator; and
   a discharge pipe connected to said flow concentrator, wherein the chopper is configured so that biomass is directed by the leaf deflector to the pneumatic impulse resource and into the shredder, which in turn discharges the shredded biomass through the flow concentrator and the discharge pipe.

2. The sugarcane biomass chopper of claim 1; wherein the main support comprises a hydraulic motor, which drives the chopper through flexible hoses.

* * * * *